(12) United States Patent
Modrego Jimenez

(10) Patent No.: US 10,131,522 B2
(45) Date of Patent: Nov. 20, 2018

(54) WIND TURBINE BLADES LIFTING DEVICE AND ASSOCIATED METHOD

(71) Applicant: GAMESA INNOVATION & TECHNOLOGY, S. L., Sarriguren (Navarra) (ES)

(72) Inventor: Raul Modrego Jimenez, Sarriguren (ES)

(73) Assignee: GAMESA INNOVATION & TECHNOLOGY, S.L., Sarriguren (Navarra) (ES)

(*) Notice: Subject to any disclaimer, the term of this patent is extended or adjusted under 35 U.S.C. 154(b) by 0 days.

(21) Appl. No.: 15/788,416

(22) Filed: Oct. 19, 2017

(65) Prior Publication Data

US 2018/0111801 A1   Apr. 26, 2018

(30) Foreign Application Priority Data

Oct. 24, 2016   (ES) .................................. 201600887

(51) Int. Cl.
| | |
|---|---|
| *B66C 1/10* | (2006.01) |
| *B66C 1/46* | (2006.01) |
| *F03D 13/10* | (2016.01) |
| *F03D 13/20* | (2016.01) |
| *F03D 13/40* | (2016.01) |
| *F03D 80/50* | (2016.01) |

(52) U.S. Cl.
CPC ................ *B66C 1/108* (2013.01); *B66C 1/46* (2013.01); *F03D 13/10* (2016.05); *F03D 13/20* (2016.05); *F03D 13/40* (2016.05); *F03D 80/50* (2016.05); *F05B 2230/61* (2013.01)

(58) Field of Classification Search
CPC .. B66C 1/108; B66C 1/46; B25J 9/142; B25J 15/0023; F03D 13/10; F03D 13/20; F03D 13/40; F03D 80/50; F05B 2230/61
USPC ............................................. 294/67.1, 119.3
See application file for complete search history.

(56) References Cited

U.S. PATENT DOCUMENTS

| | | | |
|---|---|---|---|
| 3,915,311 A * | 10/1975 | Ball .......................... | B66C 1/10 269/22 |
| 8,240,962 B2 * | 8/2012 | Livingston ............ | F03D 1/0675 410/120 |

(Continued)

FOREIGN PATENT DOCUMENTS

| | | |
|---|---|---|
| EP | 2 952 733 A1 | 12/2015 |
| EP | 2 982 862 A1 | 2/2016 |

(Continued)

*Primary Examiner* — Dean J Kramer
(74) *Attorney, Agent, or Firm* — Ladas & Parry LLP

(57) ABSTRACT

A wind turbine blades lifting device including a structure for supporting a blade during lifting. The structure is made of a rigid material and defines a hollow closed contour with a geometry suitable for surrounding the blade, the device further comprising a pneumatic chamber attached to the structure and arranged in the hollow area of the closed contour defined by the structure such that the pneumatic chamber surrounds the blade at least partially. The pneumatic chamber is inflatable and is arranged in the closed contour defined by the structure, such that when it is inflated, the pneumatic chamber retains the blade, immobilizing it and preventing direct contact between the structure and the blade.

8 Claims, 3 Drawing Sheets

(56) References Cited

U.S. PATENT DOCUMENTS

| | | | | |
|---|---|---|---|---|
| 8,272,822 B2* | 9/2012 | Casazza | ................. | B65D 61/00 |
| | | | | 410/155 |
| 8,550,522 B2* | 10/2013 | Echarri Latasa | ....... | B66C 1/108 |
| | | | | 29/889 |
| 8,567,833 B2* | 10/2013 | Maj | ......................... | B66C 1/108 |
| | | | | 294/67.1 |
| 9,004,843 B2* | 4/2015 | Lemos | .................... | F03D 13/40 |
| | | | | 294/67.31 |
| 9,358,996 B2* | 6/2016 | Van Der Zee | .......... | B66C 1/108 |
| 9,463,541 B2* | 10/2016 | Sherrill | .................. | B23Q 3/064 |
| 2005/0258064 A1* | 11/2005 | Wobben | ................. | B65D 85/68 |
| | | | | 206/523 |
| 2006/0251517 A1* | 11/2006 | Grabau | .................... | B60P 3/40 |
| | | | | 416/202 |
| 2012/0091080 A1* | 4/2012 | Kelly | ....................... | B60P 3/40 |
| | | | | 211/60.1 |
| 2012/0112481 A1* | 5/2012 | ten Thoren | ............. | B66C 1/108 |
| | | | | 294/67.1 |

FOREIGN PATENT DOCUMENTS

| | | | | |
|---|---|---|---|---|
| ES | 2 556 997 A1 | 1/2016 | | |
| WO | WO-2013091655 A1 * | 6/2013 | ............. | B66C 1/108 |

* cited by examiner

WIND TURBINE BLADES LIFTING DEVICE AND ASSOCIATED METHOD

TECHNICAL FIELD

The present invention relates to wind turbine blades lifting devices, and to associated methods.

PRIOR ART

The development of new wind turbines has resulted in larger and more powerful ones. Large wind turbines allow installing more power in one and the same site and reduce the visual impact of a farm formed by several wind turbines.

Wind turbines comprise a fixed tower which raises a nacelle bearing an electric generator connected to a rotor by mechanical means above the ground. The rotor is formed by a hub that attaches a plurality of blades which are bolted to studs of the hub bearings and are responsible for converting kinetic energy of the wind into rotational movement of the rotor.

The increase in generated power is directly related to the increase in the dimensions of the rotor of the wind turbine, and accordingly the increase in the length of the wind turbine blades. The blades are the most critical element of the wind turbine and for this reason they are subject to preventive and corrective inspections for which it is usually necessary to disassemble the blades from the hub and lower them to the ground to subsequently lift and reassemble them in the hub once maintenance tasks have been performed.

In some cases, devices comprised in the generator itself are used for lifting and lowering blades, as disclosed for example in ES2556997A1, belonging to the same applicant. ES2556997A1 discloses a method and device for blade replacement in wind turbines that consists of two elements, one upper element and another lower element that work together to lift and lower the wind turbine blade. The upper i.e., "top", element of the device consists of elements bolted to the wind turbine bearing and blade fastening means, whereas the lower, i.e., "ground", element consists of a structure that surrounds the wind turbine tower and has at least two winches and two deviation pulleys to connect cables between the "top" element and the "ground" element of the device.

In other cases, maintenance operators use large cranes which allow handling large and heavy rotors, and they use a device which is associated with the blade and also with the crane. The device is lifted or lowered by means of actuating the crane, which in turn causes the lifting or lowering of the blade associated therewith. EP2952733A1, for example, discloses a lifting device for lifting wind turbine blades having a specific length, comprising a chassis with at least one coupling for supporting lifting means and with means for housing the blade.

DISCLOSURE OF THE INVENTION

The object of the invention is to provide a wind turbine blades lifting device, and an associated method, as defined in the claims.

A first aspect of the invention relates to a wind turbine blades lifting device, comprising a structure for supporting the blade during lifting. The structure of the device is made of a strong and rigid material and defines a hollow closed contour suitable for surrounding the blade. The device further comprises a pneumatic chamber attached to the structure and arranged in the hollow area of the closed contour defined by said structure, such that it at least partially surrounds the blade. The pneumatic chamber is inflatable and is suitable for retaining the blade when it is inflated, immobilizing it and preventing direct contact between the structure and the blade.

In this manner, on one hand the pneumatic chamber retains the blade, holding it and thus keeping it in place during the movement thereof, and the structure offers rigidity to the lifting device, such that this holding remains firm during said movement. Furthermore, this rigidity offers the necessary force for supporting the blade during the movement thereof, without the device sustaining flaws which would damage the blade since the pneumatic chamber prevents direct contact between the structure (made of a strong and rigid material) and the blade.

Therefore, with the device of the invention the blade is kept immobile and protected at the same time (from the structure itself) and offers more freedom of movement than that offered up until now. With the device of the invention, the blade can move in any direction and radius without being damaged, such as, for example, the blade can be turned over either in the blade changing operation in which the blade would be changed from vertical to horizontal (disassembly) or vice versa (assembly), or when they are stored on the ground, turning them over on the same horizontal axis by rotating 90° or 180° radially, which are often operations of interest to be performed on site.

A second aspect of the invention relates to a method of fixing a wind turbine blade to a device according to the first aspect of the invention. In the method, the hollow closed contour defined by the structure of said device is first arranged facing the tip of the blade, and then with the pneumatic chamber of said device deflated, said structure slides longitudinally on the outer surface of the blade to the desired position. Once the device is arranged in the desired position, the pneumatic chamber is inflated for immobilizing or fixing the blade.

The blade can thus be easily and securely fixed to a device in the desired position without the blade being damaged.

These and other advantages and features of the invention will become evident in view of the drawings and the detailed description of the invention.

DETAILED DISCLOSURE OF THE INVENTION

Figure 1:
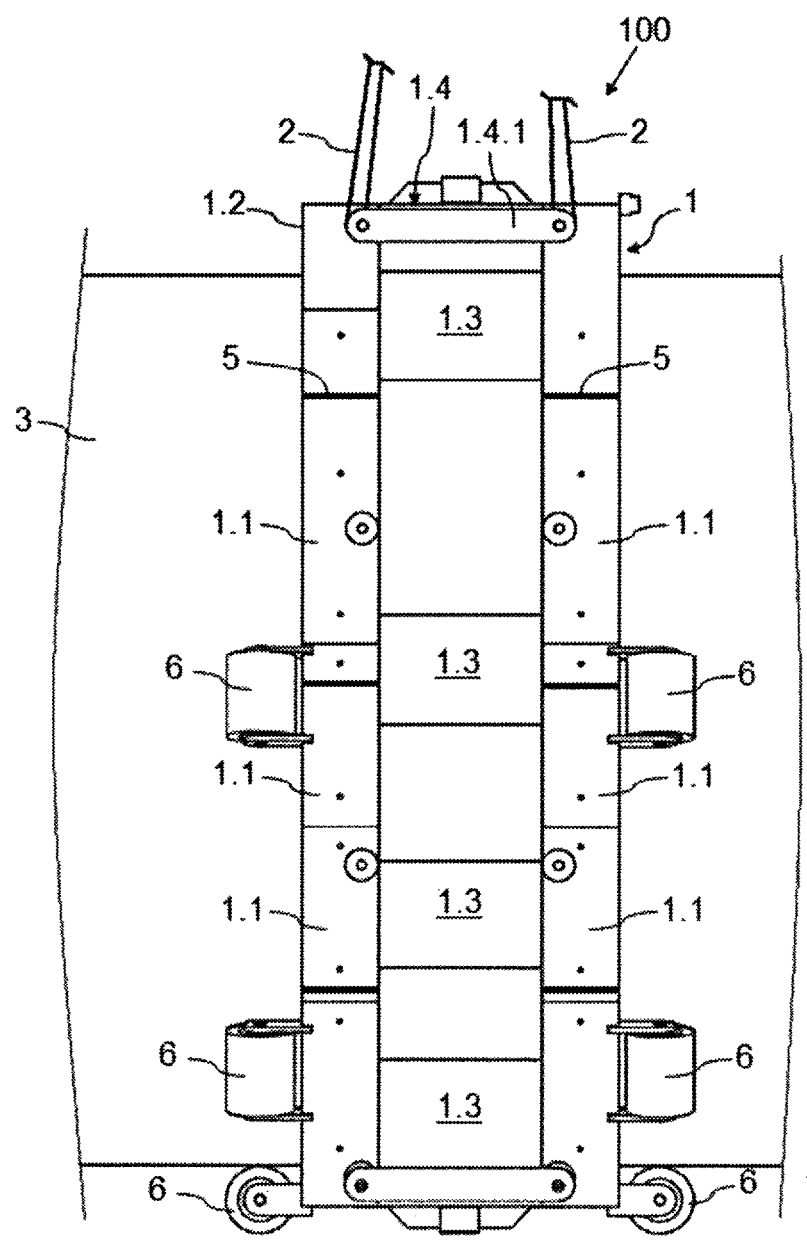
FIG. 1 is a partial side view of a wind turbine blade held by an embodiment of the wind turbine blades lifting device of the invention.
Figure 2:
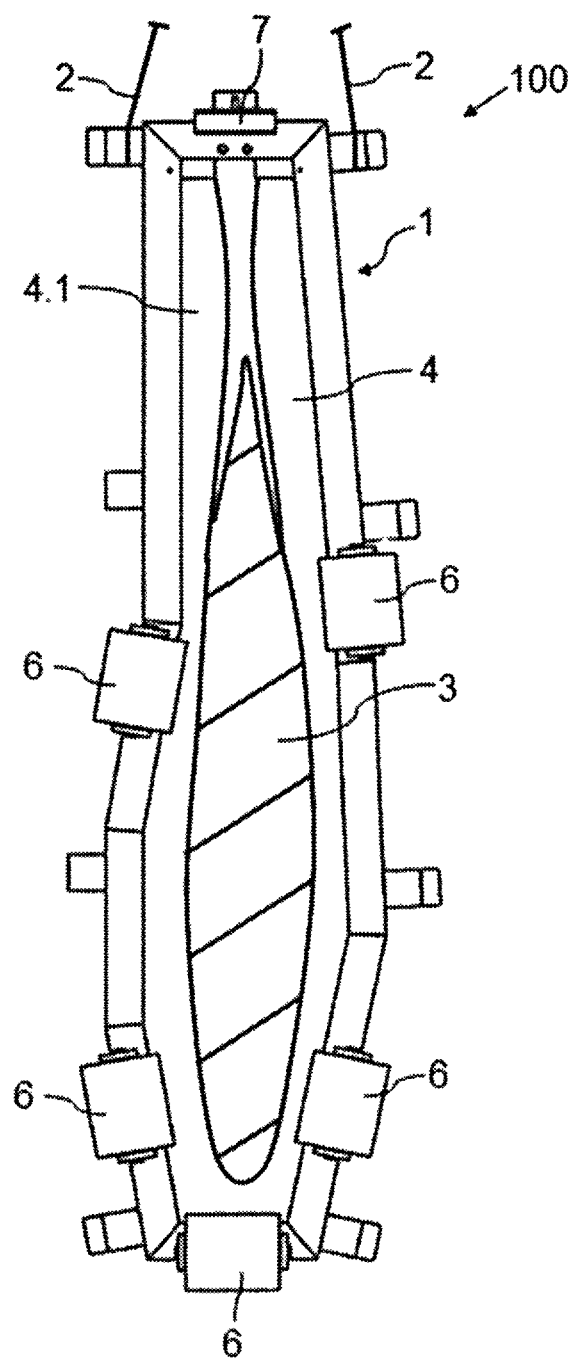
FIG. 2 is a front view of a sectioned blade held by a device according to FIG. 1, with the blade sectioned.
Figure 3:
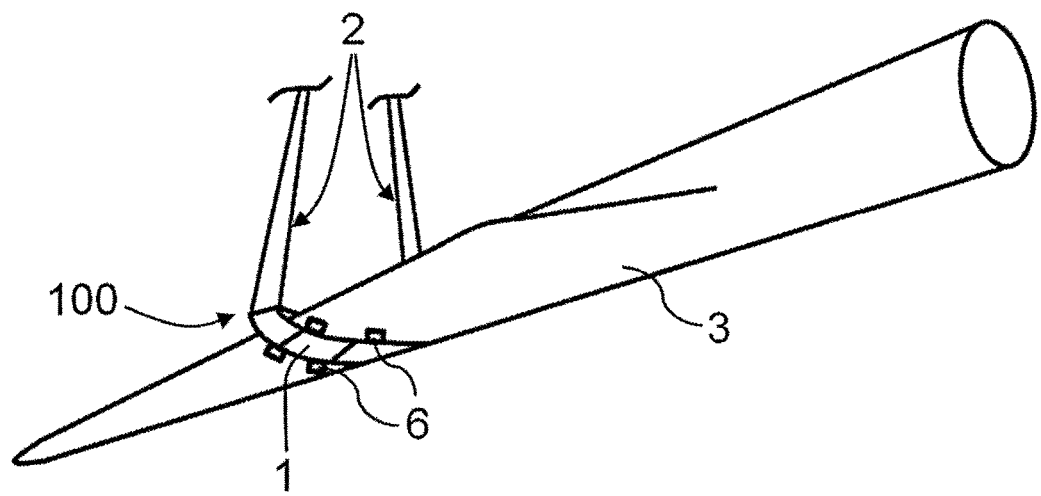
FIG. 3 depicts by way of example and in a simplified manner a moment in which a blade is moved by means of a device according to FIG. 1, the blade being held by the structure of the device.
Figure 4:
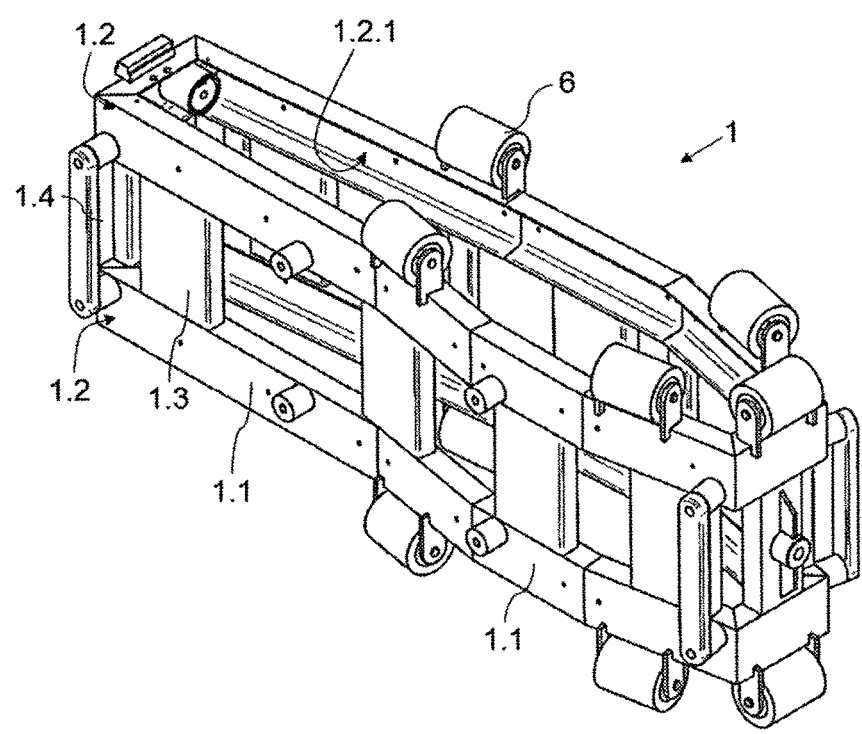
FIG. 4 is a perspective view of the structure of the device according to FIG. 1.

A first aspect of the invention relates to a wind turbine blades lifting device 100, such as the one shown by way of example in FIGS. 1 to 3. The device 100 comprises a structure 1, shown in further detail in FIG. 4, for supporting a blade 3 during lifting.

The structure 1 is made of a strong and rigid material (preferably metallic material) and defines a hollow closed contour with a geometry suitable for surrounding the blade 3. Since it is made of a strong and rigid material, the structure 1 can support the blade 3 during lifting. The device 100 further comprises a pneumatic chamber 4 attached to the structure 1, which is arranged in the hollow area of the closed contour defined by said structure 1 such that it at least partially surrounds the blade 3. The pneumatic chamber 4 is inflatable and is arranged in said contour such that when a fluid is injected into said chamber and it is inflated, said chamber 4 retains the blade 3 immobilizing it. The device 100 therefore holds on the blade 3 through the pneumatic chamber 4, and said blade 3 can be moved in the desired direction without any risk of it falling off or being separated from the device 100 during movement thereof. Furthermore, since the pneumatic chamber 4 is what retains the blade 3, the structure 1 does not contact said blade 3 and said structure 1 is prevented from being able to damage said blade 3 (due to the material of the structure 1 itself). A fluid, preferably air at a specific pressure, is introduced into the pneumatic chamber 4 to inflate it.

Due to the rigidity provided by the structure 1 and to the fact that the blade 3 is retained by the pneumatic chamber 4 (and without contacting the structure 1), the blade 3 can therefore be moved without movement limitations using the device 100 of the invention since the configuration of said device 100 keeps the blade 3 held still during the movement thereof and prevents it from falling off or accidentally moving.

The structure 1 comprises a plurality of segments 1.1 made of rigid material attached in series to form the hollow closed contour. Adjacent segments 1.1 are attached to one another, preferably in a fixed and specific manner, to give the closed contour defined by the corresponding structure 1 the desired shape to allow the adaptation thereof to the corresponding blade 3 without losing rigidity and strength. Each segment 1.1 can therefore be attached to an adjacent segment 1.1 with a specific angle, providing the contour with the desired shape.

The structure 1 preferably comprises a substantially inverted U shape in the upper part for receiving the most sensitive part of the blade 3 (the trailing edge), and the pneumatic chamber 4 is configured such that it does not press on said trailing edge, thereby assuring that pressure is only applied on the strongest areas of the blade 3, and the blade 3 can therefore be retained with higher pressure to assure greater immobilization thereof compared to the case which involves pressing said trailing edge.

In a preferred embodiment, the structure 1 comprises two sub-structures 1.2 made of a strong and rigid material, arranged parallel and spaced from one another, each of them defining a hollow closed contour and both contours being substantially equal. Each sub-structure 1.2 comprises a plurality of segments 1.1 attached in series to form the corresponding hollow closed contour. The adjacent segments 1.1 are attached to one another, preferably in a fixed and specific manner, to give the closed contour defined by the corresponding sub-structure 1.2 the desired shape. The structure 1 further comprises a plurality of sections 1.3, preferably transverse sections, made of the same material as the sub-structures, attaching both sub-structures 1.2 to one another, the structure 1 thereby being formed by at least the two sub-structures 1.2 and the sections 1.3. In this manner, as a result of comprising two sub-structures 1.2, the structure 1 supports the blade 3 more reliably and evenly, since its total length is increased in a simple manner and said blade 3 is prevented from tending to move to one side or another, which would increase the stress the device 100 would have to withstand. Furthermore, this is achieved with a structure 1 that is lighter than it would be were it not made up of two parallel sub-structures 1.2 separated from one another, without this affecting the rigidity and strength required to enable supporting the blade 3.

The pneumatic chamber 4 comprises a respective pneumatic sub-chamber 4.1 for each sub-structure 1.2 of the structure 1, and each pneumatic sub-chamber 4.1 is attached to the corresponding sub-structure 1.2. The attachment is preferably done by means of an attachment element 5 surrounding both the pneumatic sub-chamber 4.1 and the corresponding sub-structure 1.2, and said attachment element 5 comprises elastic properties to allow inflating said pneumatic sub-chamber 4.1. Each sub-structure 1.2 of the structure 1 comprises a housing 1.2.1 in which the corresponding pneumatic sub-chamber 4.1 of the pneumatic chamber 4 is supported or housed, and, said housing 1.2.1 preferably comprises a substantially U-shaped cross-section. Therefore when the pneumatic chamber 4 is not inflated, it is securely housed inside said housing 1.2.1, the pneumatic chamber 4 always being protected by the structure 1.

The device 1 further comprises a fluid distributor 7, preferably fixed in the upper part of the structure 1 and attached to the two sub-structures 1.2, said distributor 7 being in fluid communication with both pneumatic sub-chambers 4.1 of the pneumatic chamber 4 for inflating them with the corresponding fluid (the same fluid for both sub-chambers). The distributor 7 can be connected to an external pressurized air source, for example, and it distributes the air from said source to the two pneumatic sub-chambers 4.1.

The device 100 further comprises a plurality of rollers 6 attached to the structure 1 with freedom of rotation with respect to their respective axes. The rollers 6 are furthermore attached to the structure 1 such that with the pneumatic chamber 4 deflated and the structure 1 surrounding the blade 3, said rollers 6, but not the structure 1, contact the outer surface of the blade 3. This thereby allows bringing the device 100 to the required position of the blade 3, the device 100 moving over said blade 3 without damaging said blade 3 since the rollers 6 roll on the outer surface of said blade 3 and prevent the contact of the structure 1 with the blade 3 despite the pneumatic chamber 4 being deflated. The rollers 6 thus project from one side of the structure 1, although the device 100 preferably comprises a plurality of rollers 6 projecting from one a side and another plurality of rollers 6 projecting from the other side. To prevent the rollers 6 from damaging the blade 3, the material of said rollers 6 is selected so that it is strong enough to roll stably over the blade 3 and soft enough to not damage said blade 3 while rolling on the outer surface of the blade 3.

The device 100 further comprises at least one coupling 1.4, preferably a transverse coupling, that is attached to an outer surface of the structure 1 and is suitable for being supported by lifting means 2 which lift the device 100 and the blade 3 immobilized by said device 100, as can be seen from FIG. 3, for example. The lifting means 2 can be a sling, for example, which on one hand supports the device 100 and on the other is hooked to a crane or equivalent lifting device, such that by means of actuating said crane and by means of the sling the required movement of the device 100 (as a result of the coupling 1.4) and therefore of the blade 3 is produced. The coupling 1.4 is attached to the structure 1 at at least two distant points, such that it comprises a section 1.4.1 between both points which is separated from the structure 1, said space being used for the lifting means 2 to support the device 100.

A second aspect of the invention relates to a method of fixing a wind turbine blade to a device 100 according to the first aspect of the invention. In the method, the hollow closed contour defined by the structure 1 of said device 100 is first arranged facing the tip of the blade 3, and with the pneumatic chamber 4 of said device 100 deflated, said structure 1 slides longitudinally on the outer surface of the blade 3 to the desired position. The movement can be produced by means of a crane or an equivalent lifting device.

Once the device 100 is in the desired position surrounding the blade 3 (farther from or closer to the root), the pneumatic chamber 4 of the device 100 is inflated, the immobilization or fixing of the blade 3 taking place. With the blade 3 thus immobilized, said blade 3 can be moved to bring it to the required location (it can be lifted to the hub of a wind turbine, for example), without any risk of it falling off or coming loose from the device 100.

The invention claimed is:

1. A wind turbine blades lifting device (100) comprising a structure (1) for supporting a blade (3) during lifting, wherein the structure (1) is made of a rigid material and defines a hollow closed contour with a geometry suitable for surrounding the blade (3), the device (100) further comprising:
   a pneumatic chamber (4) attached to the structure (1) and arranged in the hollow area of the closed contour defined by said structure (1), such that said pneumatic chamber (4) surrounds the blade (3) at least partially, said pneumatic chamber (4) being inflatable and being arranged in the closed contour defined by the structure (1) such that when said pneumatic chamber (4) is inflated, said pneumatic chamber (4) retains the blade (3), immobilizing the blade (3) and preventing direct contact between the structure (1) and the blade (3),
   wherein the structure (1) comprises a plurality of segments (1.1) fixed to one another in series in a specific manner to form the hollow closed contour with the required shape,
   wherein the structure (1) comprises two parallel sub-structures (1.2) spaced from one another, each of them defining a hollow closed contour and both contours being equal, each sub-structure (1.2) comprising a plurality of segments (1.1) attached in series to form the corresponding hollow closed contour, and a plurality of sections (1.3) attaching both sub-structures (1.2) to one another,
   wherein said pneumatic chamber (4) comprises a respective pneumatic sub-chamber (4.1) for each sub-structure (1.2) of the structure (1), each pneumatic sub-chamber (4.1) being attached to the corresponding sub-structure (1.2), and
   wherein each sub-structure (1.2) of the structure (1) comprises an inner surface on which the corresponding pneumatic sub-chamber (4.1) of the pneumatic chamber (4) is supported, each sub-structure (1.2) comprising a housing (1.2.1) on the inner surface thereof for housing the corresponding pneumatic sub-chamber (4.1) of said pneumatic chamber (4), each housing (1.2.1) comprising a substantially U-shaped cross-section.

2. A wind turbine blades lifting device (100) comprising a structure (1) for supporting a blade (3) during lifting, wherein the structure (1) is made of a rigid material and defines a hollow closed contour with a geometry suitable for surrounding the blade (3), the device (100) further comprising:
   a pneumatic chamber (4) attached to the structure (1) and arranged in the hollow area of the closed contour defined by said structure (1), such that said pneumatic chamber (4) surrounds the blade (3) at least partially, said pneumatic chamber (4) being inflatable and being arranged in the closed contour defined by the structure (1) such that when said pneumatic chamber (4) is inflated, said pneumatic chamber (4) retains the blade (3), immobilizing the blade (3) and preventing direct contact between the structure (1) and the blade (3),
   wherein the structure (1) comprises a plurality of segments (1.1) fixed to one another in series in a specific manner to form the hollow closed contour with the required shape,
   wherein the structure (1) comprises two parallel sub-structures (1.2) spaced from one another, each of them defining a hollow closed contour and both contours being equal, each sub-structure (1.2) comprising a plurality of segments (1.1) attached in series to form the corresponding hollow closed contour, and a plurality of sections (1.3) attaching both sub-structures (1.2) to one another,
   wherein said pneumatic chamber (4) comprises a respective pneumatic sub-chamber (4.1) for each sub-structure (1.2) of the structure (1), each pneumatic sub-chamber (4.1) being attached to the corresponding sub-structure (1.2), and
   wherein each pneumatic sub-chamber (4.1) is attached to the corresponding sub-structure (1.2) by means of an attachment element (5) surrounding both the pneumatic sub-chamber (4.1) and the corresponding sub-structure (1.2), said attachment element (5) comprising elastic properties to allow inflating the corresponding pneumatic sub-chamber (4.1).

3. A wind turbine blades lifting device (100) comprising a structure (1) for supporting a blade (3) during lifting, wherein the structure (1) is made of a rigid material and defines a hollow closed contour with a geometry suitable for surrounding the blade (3), the device (100) further comprising:
   a pneumatic chamber (4) attached to the structure (1) and arranged in the hollow area of the closed contour defined by said structure (1), such that said pneumatic chamber (4) surrounds the blade (3) at least partially, said pneumatic chamber (4) being inflatable and being arranged in the closed contour defined by the structure (1) such that when said pneumatic chamber (4) is inflated, said pneumatic chamber (4) retains the blade (3), immobilizing the blade (3) and preventing direct contact between the structure (1) and the blade (3),
   wherein the structure (1) comprises a plurality of segments (1.1) fixed to one another in series in a specific manner to form the hollow closed contour with the required shape,
   wherein the structure (1) comprises two parallel sub-structures (1.2) spaced from one another, each of them defining a hollow closed contour and both contours being equal, each sub-structure (1.2) comprising a plurality of segments (1.1) attached in series to form the corresponding hollow closed contour, and a plurality of sections (1.3) attaching both sub-structures (1.2) to one another,
   wherein said pneumatic chamber (4) comprises a respective pneumatic sub-chamber (4.1) for each sub-structure (1.2) of the structure (1), each pneumatic sub-chamber (4.1) being attached to the corresponding sub-structure (1.2), and
   a fluid distributor (7) fixed in an upper part of the structure (1) and attached to the two sub-structures (1.2), said distributor (7) being in fluid communication with both pneumatic sub-chambers (4.1) of the pneumatic chamber (4) for inflating them with a corresponding fluid.

4. A wind turbine blades lifting device comprising a structure (1) for supporting the blade (3) during lifting, wherein the structure (1) is made of a rigid material and defines a hollow closed contour with a geometry suitable for surrounding the blade (3), the device (100) further comprising:
- a pneumatic chamber (4) attached to the structure (1) and arranged in the hollow area of the closed contour defined by said structure (1), such that the pneumatic chamber (4) surrounds the blade (3) at least partially, said pneumatic chamber (4) being inflatable and being arranged in the closed contour defined by the structure (1) such that when it is inflated, said pneumatic chamber (4) retains the blade (3), immobilizing it and preventing direct contact between the structure (1) and the blade (3); and
- a plurality of rollers (6) attached to the structure (1) with freedom of rotation with respect to their own respective axes, said rollers (6) being attached to the structure (1) such that with said pneumatic chamber (4) deflated and the structure (1) surrounding the blade (3), said rollers (6) contact the blade (3) before the structure (1) contacts the blade (3), said rollers (6) projecting from at least one side of the structure (1), and the material of said rollers (6) being selected so that it is strong enough to roll stably over the blade (3) and soft enough to not damage the blade (3) during rolling.

5. The device according to claim 4, comprising at least one transverse coupling (1.4) that is attached to an outer surface of the structure (1) and is suitable for being supported by lifting means (2) which lift the device (100) and the associated blade (3), the coupling (1.4) being attached to the structure (1) at at least two distant points and the coupling (1.4) comprising a section (1.4.1) between both points which is separated from the structure (1), such that said separation is used for said lifting means (2) to support the device (100).

6. A method of fixing a wind turbine blade to a device according to claim 4, wherein the hollow closed contour defined by the structure (1) of the device (100) is arranged facing the tip of the blade (3), and with said pneumatic chamber (4) of the device (100) deflated, the structure (1) slides longitudinally on the outer surface of the blade (3) to the desired position.

7. The method of fixing a wind turbine blade according to claim 6, wherein with the structure (1) being in the desired position, said pneumatic chamber (4) is inflated so that said pneumatic chamber (4) retains the blade (3) immobilizing the blade (3), and causes the lifting of the device (100), and therefore of the blade (3) immobilized by the device (100).

8. The device according to claim 4, wherein the structure (1) comprises a substantially inverted U shape in an upper part suitable for receiving the trailing edge of the blade (3).

* * * * *